(12) United States Patent
Angliker et al.

(10) Patent No.: US 11,668,592 B2
(45) Date of Patent: Jun. 6, 2023

(54) METHOD AND COMPUTERIZED MEASURING SYSTEM FOR CONFIGURING A SYSTEM TO DETECT A MEASURED PHYSICAL VARIABLE

(71) Applicant: Kistler Holding AG, Winterthur (CH)

(72) Inventors: Marco Angliker, Zürich (CH); Viola Ehrensperger, Henggart (CH); Frederic De Simoni, Aarau (CH); Michael Lauffer, Bülach (CH)

(73) Assignee: Kistler Holding AG, Winterthur (CH)

( * ) Notice: Subject to any disclaimer, the term of this patent is extended or adjusted under 35 U.S.C. 154(b) by 1064 days.

(21) Appl. No.: 16/280,244

(22) Filed: Feb. 20, 2019

(65) Prior Publication Data

US 2019/0265087 A1 Aug. 29, 2019

(30) Foreign Application Priority Data

Feb. 23, 2018 (EP) .................................. 18158312

(51) Int. Cl.
*G01D 18/00* (2006.01)
*G01D 7/00* (2006.01)
*G01D 21/00* (2006.01)

(52) U.S. Cl.
CPC ............... *G01D 18/00* (2013.01); *G01D 7/00* (2013.01); *G01D 21/00* (2013.01)

(58) Field of Classification Search
CPC .......... G01D 18/00; G01D 7/00; G01D 21/00; G01D 21/02; G01D 1/00; G08C 19/00; G06F 15/0275; G06F 17/5009
See application file for complete search history.

(56) References Cited

U.S. PATENT DOCUMENTS

| | | | |
|---|---|---|---|
| 2003/0036876 A1* | 2/2003 | Fuller, III | G06Q 30/0601 702/127 |
| 2004/0139186 A1* | 7/2004 | Lee | G06F 11/3409 714/E11.192 |
| 2017/0357492 A1* | 12/2017 | Adler | H04L 67/34 |

OTHER PUBLICATIONS

Betta, Giovanni, et al., "Experimental Design Techniques for Optimising Measurement Chain Calibration," Institute of Measurement and Control, col. 30, Issue 2, Sep. 2001, pp. 115-127.

(Continued)

*Primary Examiner* — Son T Le
*Assistant Examiner* — Matthew W. Baca
(74) *Attorney, Agent, or Firm* — Dority & Manning, P.A.

(57) ABSTRACT

A method of using a measuring system for detecting a measured physical variable pertains to measuring systems that include a plurality of transmission members forming a measuring chain for detecting the measured physical variable and in which transmission members that are immediately successive in the measuring chain are in a cause-and-effect relationship to each other. The method includes the steps of: a) specifying the measured physical variable to be detected; b) using a computer to compile several measuring chains that include transmission members necessary for the detection of the specified measured physical variable; c) determination of performance criteria of the compiled measuring chains; d) using the determined performance criteria to assess each of the compiled measuring chains; and e) identification of a measuring chain that best satisfies one of the performance criteria determined.

7 Claims, 5 Drawing Sheets

(56) References Cited

OTHER PUBLICATIONS

European Search Report and Written Opinion of International Searching Authority, for Patent Application No. 18158312.1-1022, dated Aug. 27, 2018.
Fowler, Kim R, et al., "Sensors: The First Stage in the Measurement Chain," IEEE Instrumentation & Measurement Magazine, vol. 7 Issue 3, Sep. 2004, pp. 60 to 66.
Rauth, D A, et al. "Sensors and Signal Conditioning," IEEE Instrumentation & Measurement Magazine, vol. 8 Issue 2, Jun. 2005, pp. 48-53.

* cited by examiner

METHOD AND COMPUTERIZED MEASURING SYSTEM FOR CONFIGURING A SYSTEM TO DETECT A MEASURED PHYSICAL VARIABLE

FIELD OF THE INVENTION

The invention relates to a computerized measuring system for detecting a measured physical variable; which system comprises a plurality of transmission members that form a measuring chain for measuring the measured physical variable and that are immediately successive in the measuring chain in a cause-and-effect relationship to each other.

BACKGROUND OF THE INVENTION

It is known to detect a measured physical variable by means of a measuring system. As used herein, a measured physical variable may be any physical property that varies and that can be measured according to the laws of physics. Such well known parameters as a force, a pressure, a mass, a temperature, and many others, are examples of a measured physical variable. Moreover, the measured physical variable thus lends itself capable of presentation in the form of a number and an associated unit of measurement. Examples of some of the more typically encountered units of measurement include Newtons (N) for force, Pascals ($N/m^2$) for pressure, Kilograms (kg) for mass, Kelvins (K) for temperature, etc.

In general, a number of temporally and spatially separated steps must be performed in the course of performing a method for the detection of a measured physical variable. Take the example of a method for the detection of a pressure in a measuring chamber in which is arranged a piezoelectric pressure sensor that generates an electrical charge proportional to the prevailing pressure inside the chamber. That electrical charge is the measurement signal that must be transmitted from the sensor via a signal cable to an evaluation unit that is physically separate from the measuring chamber. The measurement signal is then processed by the evaluation unit, which for example can include an electrical amplifier that electrically amplifies the measurement signal. The electrically amplified measurement signal is then sent via a transmission cable to a display device on which the user perceives the electrically amplified measurement signal on a display as the measured value of pressure within the measuring chamber. Generation of the electric charge by the piezoelectric pressure sensor takes place temporally before the measurement signal is transmitted via the signal cable and before the measurement signal is processed (e.g., amplified) and before the measured value is displayed for perception by the user. Thus, a measuring system of this type comprises several transmission members such as a sensor, a measuring cable, an evaluation unit, which can in turn include an amplifier and a transmission cable, and a display device. Taken together, these several transmission members form a measuring chain. For the detection of the measured physical variable and its conversion into a measured value that can be perceived by the user, immediately successive transmission members of the measuring chain are related to each other in a cause-and-effect relationship.

The detection of the measured physical variable is subject to performance criteria such as availability, measurement sensitivity, number of channels, measurement uncertainty, etc. Thus, a measuring chain is often composed from locally available transmission members simply because they are readily and easily accessible. However, such available transmission members might be of suboptimal suitability for detecting the measured physical variable, for example because a measurement sensitivity of an available piezoelectric pressure sensor is too low to detect the pressure in the chamber, or because an evaluation unit has too few channels to be available to receive the measurement signal for processing. These problems are compounded in a complex device involving many sensors simultaneously detecting many independent physical variables that must be measured and then coordinated to achieve useful information for presentation to a user or to provide feedback to the device. These problems are yet again compounded in a complex industrial system involving many such complex devices that must be coordinated to achieve a desired outcome such as manufacture of a part in an injection molding process. Moreover, an additional complication to each of these scenarios is presented when the complex device or the complex system having numerous complex devices must be monitored and/or controlled in a cloud-based infrastructure that is becoming the norm.

BRIEF OBJECTS AND SUMMARY OF THE INVENTION

It is an object of the present invention to provide a computerized measuring system for detecting a measured physical variable wherein said system operates the measuring chain in accordance with pre-set performance criteria while conserving time and material consumed in operating the system.

The invention relates to a method for detecting a measured physical variable by means of a computerized data acquisition system that includes a plurality of transmission members. These transmission members form a measuring chain for the detection of the measured physical variable. Such transmission members that are immediately successive in the measuring chain are in a cause-and-effect relationship to each other. The invention is characterized by the steps of: a) specifying the measured physical variable to be detected; b) automated compilation of several measuring chains comprising the transmission members necessary for the detection of the specified measured physical variable; c) determining performance criteria for the compiled measuring chains; d) comparing the compiled measuring chains with each other on the basis of the performance criteria determined; and e) identifying of a measuring chain which best satisfies one of the performance criteria determined.

The invention uses a database that includes performance criteria for many different measurement devices and measurement systems. While the population of this database can vary, the applicant possesses sufficient expertise as a commercial provider of measurement systems to provide a database of many different measurement devices and measurement systems that can be used in an embodiment of the invention to help a user in assembling the measuring chain needed to detect a particular measured physical variable.

This is where the invention comes into play. The user specifies the particular measured physical variable that is to be detected. Preferably, at this stage the user already makes specifications with respect to performance criteria, i.e., the user specifies according to which performance criteria the measurement should take place. Then, the expert knowledge of the applicant is provided to the user in the form of an embodiment of the database that includes performance criteria for many different measurement devices and measurement systems employed by the applicant or known by the applicant from third parties. Several measuring chains will be automatically compiled for the user comprising the transmission members necessary for detecting the specified measured physical variable. An automated compilation of several measuring chains according to the present invention refers to an automatic compilation of several measuring chains by a computer program product without any intervention by the user. In this way, the user is provided with expert knowledge regarding possible variations in detecting the measured physical variable. Then, performance criteria are determined for the compiled measuring chains. Preferably, the specifications made with respect to performance criteria are taken into account. In this way, it is possible to compare the compiled measuring chains on the basis of the performance criteria determined. A performance-related ranking can be performed due to the performance criteria determined. Thus, it is possible to identify the measuring chain among the compiled measuring chains that best fulfills one of the determined performance criteria. In this way, the user obtains a measuring chain that has been composed automatically with minimal use of time and materials.

Steps a) to e) in the method according to the invention for detecting a measured physical variable are performed by a computer program product.

BRIEF DESCRIPTION OF THE DRAWINGS

In the following the invention will be exemplarily illustrated with reference to the Figures in which.

DETAILED DESCRIPTION OF EXEMPLARY EMBODIMENTS

Figure 1:
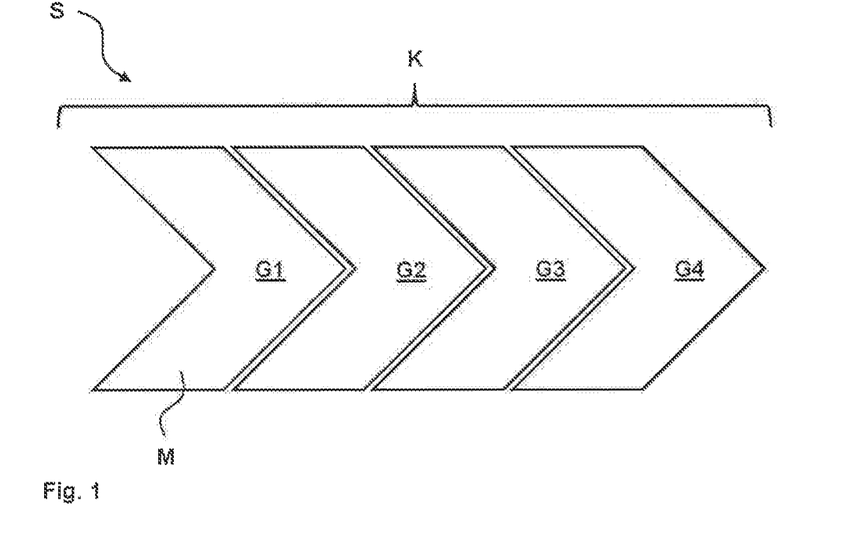
FIG. 1 shows a representation of a measuring system S comprising a plurality of transmission members G1-G4.

FIG. 1 shows an embodiment of a measuring system S comprising several transmission members G1-G4. As stated in the beginning, the measuring system S serves to detect a measured physical variable M. For this purpose, the transmission members G1-G4 form a measuring chain K. As used in the present invention, G1-G4 is short for G1, G2, G3, G4. Immediately successive transmission members G1-G4 of the measuring chain K, for example the transmission members. G1 and G2 or the transmission members G2 and G3, are in a cause-and-effect relationship to each other for the detection of the measured physical variable M. Thus, the output of G1 is needed as the input for G2, and G2 cannot perform its function until G1 has performed its function. Similarly, the output of G2 is needed as the input for G3, and G3 cannot perform its function until G2 has performed its function. In the embodiment shown in FIG. 1 four transmission members G1-G4 are shown; however, those skilled in the art knowing the present invention may also compose a measuring system that comprises more or fewer transmission members.

The measured physical variable M that is to be detected will place constraints on the measuring chain K and the elements G1, G2, G3, G4, . . . -GN therein that will comprise the measuring chain K. A first transmission member G1 typically is a sensor, such as a pressure sensor, an acceleration sensor, a temperature sensor, etc. Accordingly, the sensor G1 measures the measured physical variable M such as a pressure, acceleration, temperature, etc., and generates an analog measurement signal such as an electric current, an electric voltage, etc. In the following example, the sensor G1 will be described as the exemplary embodiment of a piezoelectric sensor. For a piezoelectric sensor, the analog measurement signal is essentially proportional to the measured physical variable M. A piezoelectric sensor measures a pressure with a measurement sensitivity of several pC/bar or a force with a measurement sensitivity of several pC/N. A piezoelectric sensor with integrated electronics measures an acceleration with a measurement sensitivity of several mV/g. However, the measurement sensitivity of a piezoelectric sensor varies with the ambient temperature and the age of the piezoelectric sensor. Age-related variations in measurement sensitivity of a piezoelectric sensor can be compensated for by a time interval since its last calibration and a calibration accuracy. The more often and the more accurately a piezoelectric sensor is calibrated, then the better the age-related change in measurement sensitivity will be known. Furthermore, the analog measurement signal exhibits only a small deviation from the proportionality to the measured physical variable M which is referred to as the linearity of the piezoelectric sensor. The piezoelectric sensor is designed for operation under a maximum operating temperature. Moreover, the analog measurement signal is reproducible only within the measurement accuracy of the piezoelectric sensor which in turn is dependent on environmental conditions such as vibrations, high temperatures, electromagnetic fields, etc.

Figure 3:
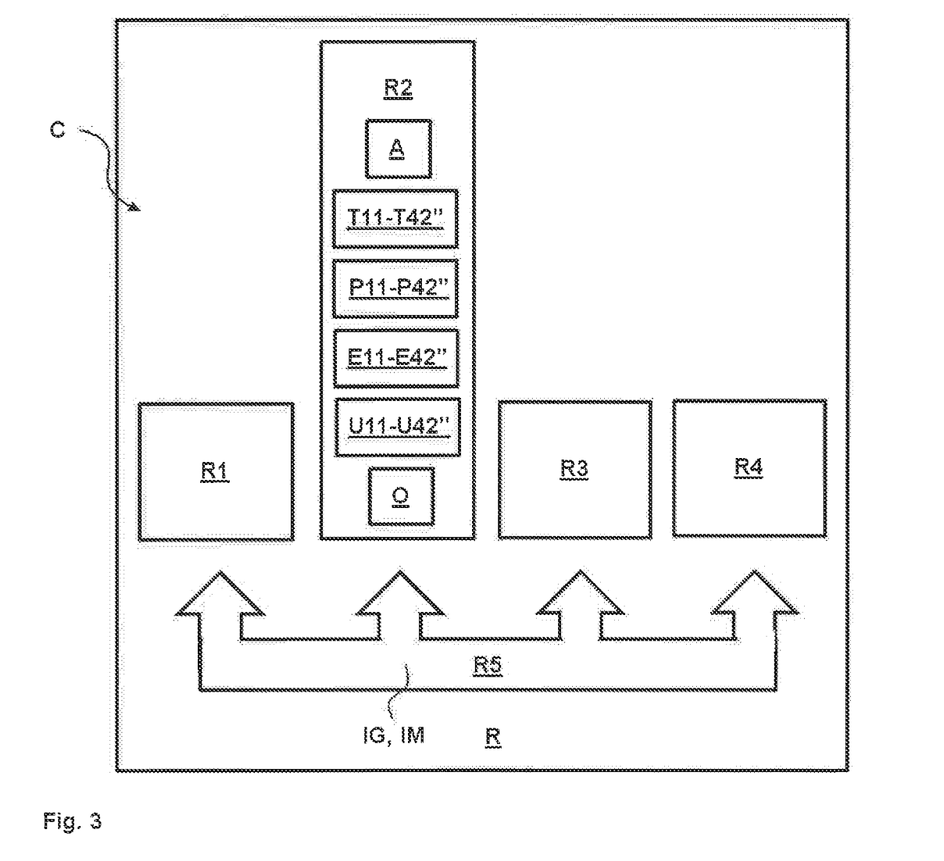
FIG. 3 shows a representation of a computing system R for a computer program product C for carrying out the method V according to FIG. 2.

As schematically shown in FIG. 3, the "measurement sensitivity of the piezoelectric sensor" is a first technical parameter contribution T11 of the first transmission member G1. The "linearity of the piezoelectric sensor" is a second technical parameter contribution T12 of the first transmission member G1. The "measurement accuracy of the piezoelectric sensor" is a third technical parameter contribution T13 of the first transmission member G1. Depending on the sensor, the method of the present invention allows for additional technical parameter contributions T14, T15, T16, etc., as needed. The notation for the first technical parameter contribution of the second transmission member G2, which might be a transmission cable for example, would be T21, following by T22 for the second technical parameter contribution, and so on.

As schematically shown in FIG. 3, an "availability of the piezoelectric sensor" is a first physical characteristic contribution P11 of the first transmission member G1. A "procurement price of the piezoelectric sensor" is a second physical characteristic contribution P12 of the first transfer member G1. Depending on the sensor, the method of the present invention allows for additional physical characteristic contributions P13, P14, P15, etc., as needed. The notation for the first physical characteristic contribution of the second transmission member G2, which might be a transmission cable for example, would be P21, followed by P22 for the second physical characteristic contribution, and so on.

As schematically shown in FIG. 3, a "temperature dependence of the measurement sensitivity of the piezoelectric sensor" is a first influencing variable E12 of the first transmission member G1 that is relevant for the measurement uncertainty U. A "time interval since the last calibration and an accuracy of calibration" is a second influencing variable E12 of the first transmission member G1 that is relevant for the measurement uncertainty U. "Environmental conditions" are a third influencing variable E13 of the first transmission member G1 that is relevant for the measurement uncertainty U. Depending on the sensor, the method of the present invention allows for additional physical characteristic contributions E14, E15, E16, etc., as needed. The notation for the first influencing variable of the second transmission member G2, which might be a transmission cable for example, would be E21, followed by E22 for the second influencing variable, and so on.

A second transmission member G2 in this example is a signal cable, which transmits the analog measurement signal from the sensor G1 to an electric amplifier. The measurement signal may have a frequency of several GHz. The impedance of the signal cable becomes an importance technical parameter contribution to be taken into account. The cable impedance is a characteristic impedance by which the signal cable affects the propagation of the measurement signal in the form of electromagnetic waves. Unless the signal cable terminates in an electrical resistance element, interfering reflections of the measurement signal will occur within the signal cable. The impedance of the signal cable is dependent on the frequency of the measurement signal transmitted through the signal cable.

The "cable impedance" is a first technical parameter contribution T21 of the second transmission member G2. The "frequency" is a second technical parameter contribution T22 of the second transmission member G2.

An "availability of the signal cable" is a first physical characteristic contribution P21 of the second transmission member G2. A "procurement price of the signal cable" is a second physical characteristic contribution P22 of the second transmission member G2.

A "length of the signal cable" is a first influencing variable E21 of the second transmission member G2 that is relevant for the measurement uncertainty U. Furthermore, the "frequency" is a second influencing variable E22 of the second transmission member G2 that is relevant for the measurement uncertainty U.

A third transmission member G3 in this example is the electric amplifier which receives the transmitted analog measurement signal and electrically amplifies and converts it in a digital measurement signal. It is possible for the electric amplifier to receive analog measurement signals simultaneously from a plurality of channels. A sampling frequency may be up to 1000 kS/s per channel depending on the number of channels. A measurement accuracy of the electric amplifier also depends on the resolution per channel which may be for example 16-bit or 32-bit.

The "number of channels" is a first technical parameter contribution T31 of the third transmission member G3. The "sampling frequency" is a second technical parameter contribution T32 of the third transmission member G3. The "measurement accuracy of the electric amplifier" is a third technical parameter contribution T33 of the third transmission member G3.

An "availability of the electric amplifier" is a first physical characteristic contribution P31 of the third transmission member G3. A "procurement price of the electric amplifier" is a second physical characteristic contribution P32 of the third transmission member G3.

The "measurement accuracy of the electric amplifier" is a first influencing variable E31 of the third transmission member G3 that is relevant for the measurement uncertainty U. A "crosstalk between input channels of the electric amplifier" is a second influencing variable E32 of the third transmission member G3 that is relevant for the measurement uncertainty U.

A fourth transmission member G4 in this example is an evaluation unit for evaluating the digital measurement signal. The evaluation unit comprises a data processing processor, a data memory and a display screen. Not only is the digital measurement signal transmitted from the electric amplifier G3 to the evaluation G4 via a plurality of interfaces but the evaluation unit G4 is also able to control the electric amplifier G3 in this manner. For evaluation, the digital measurement signal may be loaded into a computer program product running on the data processing processor. The digital measurement signal may be further processed by the computer program product. Depending on the version of the loaded computer program product, the evaluation unit may process the digital measurement signal in more or less diverse ways. The digital measurement signal may be stored in the data memory. Furthermore, the digital measurement signal may be displayed on the display screen.

A "plurality of interfaces" is a first technical parameter contribution T41 of the fourth transmission member G4. A "version of the computer program product" is a second technical parameter contribution T42 of the fourth transmission member G4.

An "availability of the evaluation unit" is a first physical characteristic contribution P41 of the fourth transmission member G4. A "procurement price of the evaluation unit" is a second physical characteristic contribution P42 of the fourth transmission member G4.

"Rounding errors in the processing process" are a first influencing variable E41 of the fourth transmission member G4 that is relevant for the measurement uncertainty U. A "speed of the processing process" is a second influencing variable E42 of the fourth transmission member G4 that is relevant for the measurement uncertainty U.

Those skilled in the art and knowing the present invention may design a measuring system by using other transmission members and having different technical parameter contributions as well as different physical characteristic contributions and different influencing factors relevant for measurement uncertainty.

Figure 2:
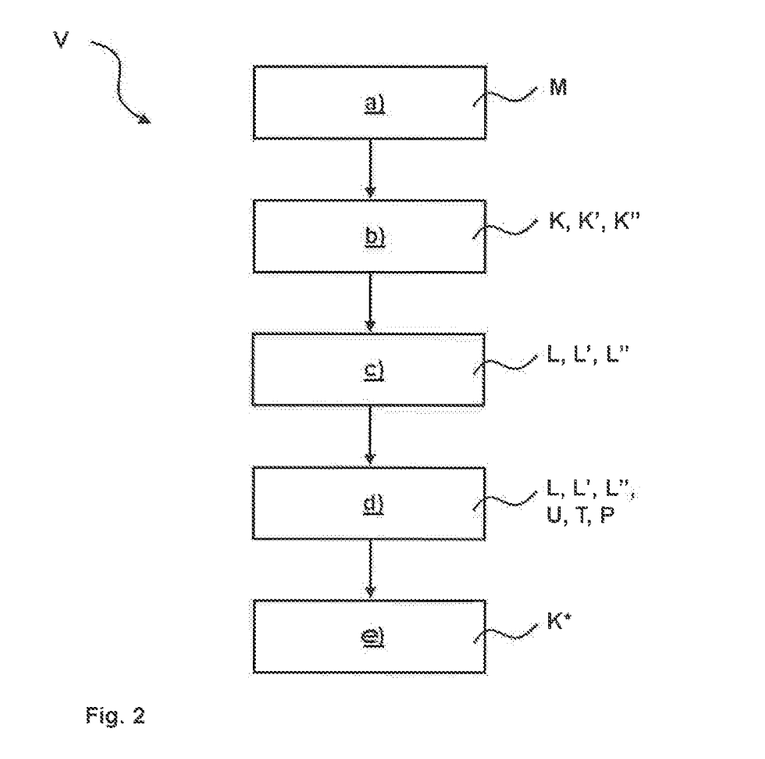
FIG. 2 shows a schematic diagram of steps a) to e) in the method V for detecting a measured physical variable M of the measuring system S according to FIG. 1.

FIG. 2 is a schematic diagram showing steps a) to e) in the method V for detecting a measured physical variable M. In step a), the measured physical variable M to be detected is specified. Step b) comprises the compilation of several measuring chains (e.g., K, K' and K"), each measuring chain including its own line-up of transmission members (e.g., G1-G4; G1'-G4' and G1"-G4") necessary for the detection of the measured physical variable M specified. In step c), performance criteria (e.g., L, L' and L") of the compiled measuring chains (e.g., K, K' and K") are determined. In step d), the compiled measuring chains (e.g., K, K' and K") are compared with one another on the basis of the determined performance criteria (e.g., L, L' and L"). Finally, in step e), the measuring chain K* that best satisfies one of the identified performance criteria (e.g., L, L' and L") is identified. In the sense of the invention, K-K" and L-L" are short for K, K', K" and L, L', L", respectively. In the sense of the invention, G1-G4" is short for G1-G4, G1'-G4', G1"-G4".

FIG. 3 schematically shows a computing system R for a computer program product C for performing the method V for detecting a measured physical variable M. The components comprised by the computing system R are a data processing processor R1, a data memory R2, at least one input unit R3, an output unit R4, and at least one communication unit R5. The computing system R may be a commercially available computer. The input unit R3 may be a computer keyboard, a computer mouse, a touch screen, a data interface, and the like. The output unit R4 may be a computer screen, a touch screen, etc. The communication unit R5 communicates data between the components of the computing system R. The communication unit R5 may be a network such as the Internet, a computer bus such as the Peripheral Component Interconnect Express (PCIe) bus, and the like. When the data interface is connected to the communication unit R5 in the embodiment of a network, then it is able to communicate within the network according to a network protocol such as the Internet Protocol (IP), the PCIe protocol, and is addressable in the network by means of a network address.

Individual components of the computing system R may be located in the measuring system S of the user, however, they may also be positioned at a location physically separated from the measuring system S of the user. "Physically separated" as used in the present invention means situated at any distance of more than 30 m. Furthermore, the components of the computing system R may be spaced apart from each other at any distance. Thus for example, in one embodiment only the input unit R3 and the output unit R4 may be positioned in the vicinity of the user while the data processing processor R1 and the data memory R2 are disposed at a location physically separated from the user. Moreover, individual components of the computing system R may be present more than once. Thus for example, in one embodiment it is possible that a first input unit and a first output unit are situated near the user while a second input unit is arranged physically separated from the user. Furthermore, it is possible that the computing system R comprises a first communication unit R5 and a second communication unit R5'.

The computer program product C is storable in the data memory R2 and is loadable into the data processing processor R1 from the data memory R2 and is executable in the data processing processor R1 for implementing the method V for determining the measurement uncertainty U of the measuring system S.

In step a), digital information IM is generated for specifying the measured physical variable M to be detected. For example, a force and an acceleration are to be detected in a measuring chamber. For this purpose, the user may enter the letters "detect force" and "detect acceleration" on the input unit R3 in the embodiment of a computer keyboard, and the computer program C is configured to respond to these user inputs by generating digital information data IM for specifying the measured physical variable M to be detected. Alternatively, the user may specify the measured physical variable M to be detected on the input unit R3 in the embodiment of a touch screen according to FIG. 4 by selecting the appropriate ones from the input fields M1-M5 displayed thereon. As an example, if a detection of a force in the measuring chamber is desired, then the user touches a first input field M1 "detect force". If a detection of an acceleration in the measuring chamber is desired, then the user touches a second input field M2 "detect acceleration". The computer program C is configured to respond to user these touches of the touch fields by generating digital information data IM for specifying the measured physical variable M to be detected.

Figure 4:
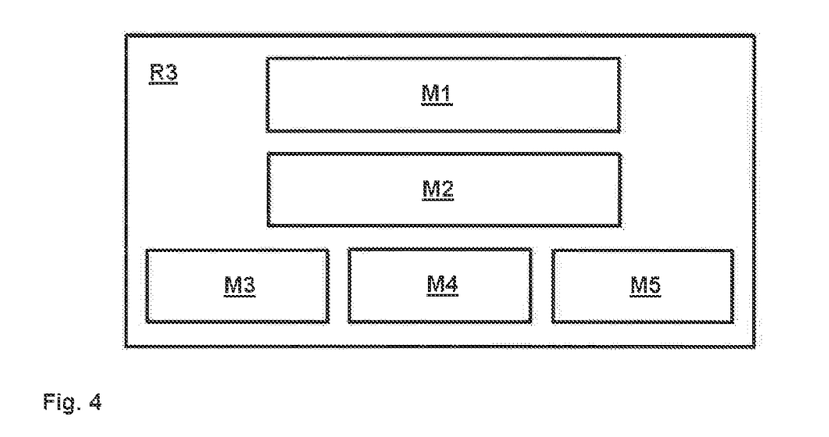
FIG. 4 shows a representation of an input unit R3 of the computing system R according to FIG. 3 for carrying out step a) of the method V according to FIG. 2.

Optionally, also digital information data IM for specifying performance criteria L-L" is generated in step a). This also may be done via a computer keyboard or a touch screen. Thus, the user may specify via a third input field M3 a technical parameter contribution T31 such as "four channels, one channel for force detection, three channels for acceleration detection". Furthermore, the user may specify via a fourth input field M4 physical characteristic contributions P11, P21, P31, P41 such as "detection period from 03/01/2020 until 03/31/2020". In addition, the user may specify via a fifth input field M5 a measurement uncertainty U such as "mean measurement uncertainty".

Digital information data IM generated at the input unit R3 is communicated via the communication unit R5 to the data processing processor R1 where it is read by the computer program product C. It is also possible for the computer program product C to automatically generate digital information data IM for specifying the measured physical variable M to be detected, for example in the context of an industrial production process of any type. Moreover, the computer program product C may also automatically generate a specification regarding performance criteria L-L", for example by taking into account empirical values of performance criteria L-L' because good parts were produced in earlier industrial production processes by using these empirical values for performance criteria L-L".

Those skilled in the art knowing the present invention may implement step a) of the method by using other input fields for different measured physical variables to be detected and different technical parameter contributions as well as different physical characteristic contributions, and a different measurement uncertainty.

Digital information data IG of a great number of transmission members G1-G4" is available. For example, digital information data IG of a great number of transmission members G1-G4" is stored in the data memory R2. The digital information data IG of each transmission member G1-G4" designates at least one intended application A, at least one technical parameter contribution T11-T42", at least one physical characteristic contribution P11-P42", at least one relevant influencing variable E11-E42", at least one measurement uncertainty contribution U11-U42", and at least one metrological compatibility O of this transmission member G1-G4". As used in the present invention, T11-T42" is short for T11-T11", T12-T12", T13-T13", T21-T21", T22-T22", T31-T31", T32-T32", T33-T33", T41-T41", T42-T41", the same applies to P11-P42", E11-E42", and U11-U42".

As schematically shown in FIG. 3, specifying at least one intended application A, at least one technical parameter contribution T11-T42", at least one physical characteristic contribution P11-P42", at least one relevant influencing variable E11-E42", at least one measurement uncertainty contribution U11-U42", and at least one metrological compatibility O for a transmission member G1-G4" is achieved in a semantic model (resource model). In the semantic model, the transmission members G1-G4", the technical parameter contributions T11-T42", the physical characteristic contributions P11-P42", the relevant influencing variables E11-E42", the measurement uncertainty contributions U11-U42", and the metrological compatibilities O are represented as resources (resource). Biunique relationships (links) are established between the resources. Thus, knowing one resource makes it possible to find all resources that are related to this resource and they can be read out from the data memory R2.

The digital information data IG of transmission members G1-G4" indicates intended applications A of transmission members G1-G4". For example, the intended application A of a transmission member G1 in the embodiment of a piezoelectric sensor is "detect force" or "detect acceleration". The intended application A of a transmission member G2 in the embodiment of a signal cable is "signal cable for a piezoelectric sensor". In another instance, the intended application of a transmission member G3 in the embodiment of an electric amplifier is "electric amplifier for a piezoelectric force sensor". In yet another instance, the intended application A of a transmission member G4 in the embodiment of an evaluation unit is "evaluation unit for a piezoelectric sensor".

The digital information data IG of transmission members G1-G4" indicates technical parameter contributions T11-T42" of transmission members G1-G4". A transmission member G1 in the embodiment of a piezoelectric sensor, for example, has three technical parameter contributions T11 "measurement sensitivity of the piezoelectric sensor", T12 "linearity of the piezoelectric sensor" and T13 "measurement accuracy of the piezoelectric sensor". A transmission member G2 in the embodiment of a signal cable, for example, has two technical parameter contributions T21 "cable impedance" and T22 "frequency". A transmission member G3 in the embodiment of an electric amplifier, for example, has three technical parameter contributions T31 "number of channels", T32 "sampling frequency" and T33 "measurement accuracy of the electric amplifier". In addition, a transmission member G4 in the embodiment of an evaluation unit, for example, has two technical parameter contributions T41 "plurality of interfaces" and T42 "version of computer program product".

The digital information data IG of transmission members G1-G4" indicates first physical characteristic contributions P11-P11", P21-P21", P31-P31", P41-P41" of transmission members G1-G4". The first physical characteristic contribution P11-P11', P21-P21", P31-P31", P41-P41" of a transmission member G1-G4" specifies whether this transmission member G1-G4" is available for detecting the measured physical variable M using the measuring system S in the specified time period and whether it is not already assigned to another measuring system for detecting another measured physical variable.

The digital information data IG of transmission members G1-G4" indicates second physical characteristic contributions P12-P12", P22-P22', P32-P32", P42-P42" of transmission members G1-G4". The second physical characteristic contribution P12-P12", P22-P22", P32-P32", P42-P42" of a transmission member G1-G4" indicates a procurement price of this transmission member G1-G4".

The digital information data IG of transmission members G1-G4" indicates relevant influencing variables E11-E42" of transmission members G1-G4". An influencing variable E11-E42" is relevant if it makes a significant contribution to the measurement uncertainty U of the measuring system S. Preferably, those influencing variables E11-E42" are relevant which make the largest contribution to the measurement uncertainty U and which have a total contribution of at least 80% to the measurement uncertainty U. The relevance of an influencing variable is determined in advance. Preferably, only relevant influencing variables E11-E42" are considered in the determining of the influencing variables on the measurement uncertainty U. A transmission member G1 in the embodiment of a piezoelectric sensor, for example, has three relevant influencing variables E11 "temperature dependence of the measurement sensitivity of the piezoelectric sensor", E12 "time interval since the last calibration and accuracy of the calibration", and E13 "environmental conditions". A transmission member G2 in the embodiment of a signal cable, for example, has two relevant influencing variables E21 "signal cable length" and E22 "frequency". A transmission member G3 in the embodiment of an electric amplifier, for example, has two relevant influencing variables E31 "measurement accuracy of the electric amplifier" and E32 "crosstalk between input channels of the electric amplifier". A transmission member G4 in the embodiment of an evaluation unit, for example, has two relevant influencing variables E41 "rounding error in the processing process" and E42 "speed of the processing process".

The digital information data IG of transmission members G1-G4" indicates measurement uncertainty contributions U11-U42". For this purpose, for relevant influencing variables E11-E42" stored in the data memory R2 are also stored estimated values for the best influencing variables as well as the measurement uncertainty contributions U1-U42" assigned to these estimated values for the best influencing variables. Preferably, the estimates of the best influencing variables and the measurement uncertainty contributions U11-U42" assigned to these estimates of the best influencing variables are determined in advance and assigned to the relevant influencing variables E11-E42". Thus, if a transmission member G1-G4" has at least one relevant influencing variable E11-E42" there will also be at least one measurement uncertainty contribution U11-U42" assigned to this relevant influencing variable E11-E42".

Furthermore, the digital information data IG of transmission members G1-G4" indicates metrological compatibilities O of transmission members G1-G4". The metrological compatibilities O indicate with which other transmission members G1-G4" a given transmission member G1-G4" will be compatible for forming a measuring chain K-K". Thus, the metrological compatibilities O of a transmission member G1 in the embodiment of a piezoelectric sensor indicate which further transmission members G2 in the embodiment of a signal cable and which further transmission members G3 in the embodiment of an electric amplifier and which further transmission members G4 in the embodiment of an evaluation unit will be metrologically compatible with this piezoelectric sensor.

To carry out step b), the computer program product C is configured to read digital information data IG regarding intended applications A of transmission members G1-G4". The computer program product C is configured to relate the digital information data IM of the measured physical variable M to be detected and the read digital information data IG for intended applications A. In this way, at least one transmission member G1-G4" is determined whose digital information data IG indicates an intended application A, which intended application A corresponds to the digital information data IM for specifying the measured variable M to be detected. For example, if the digital information data IM of the measured physical variable M to be detected specifies "detect force", the computer program product C then determines at least one transmission member G1-G1" in the embodiment of a piezoelectric force sensor whose digital information data IG specifies the intended application A "detect force".

Then, the computer program product C reads metrological compatibilities O for the at least one transmission member G1-G1" that was determined in this way. The computer program product C automatically composes several measuring chains K-K" for the detection of the specified measured physical variable M using digital information data IG regarding metrological compatibilities O of the determined transmission member G1-G1" with further transmission members G2-G4". By way of example, the computer program product C compiles three measuring chains K-K" wherein four first transmission members G1-G4 form a first measuring chain K, four second transmission members G1'-G4' form a second measuring chain K', four third transmission members G1"-G4" form a first measuring chain K". The compiled measuring chains K-K" will differ from each other in at least one transmission member G1-G4". Thus, the first measuring chain K and the third measuring chain K" may comprise identical first and second transmission members, G1=G1", G2=G2", but different third and fourth transmission members G3*G3", G4*G4".

Optionally, in step b) at least one transmission member G1-G4" is determined whose digital information data IG indicates a technical parameter contribution T11-T42" or a physical characteristic contribution P11-P42" or a measurement uncertainty contribution U11-U42", which technical parameter contribution T11-T42" or physical characteristic contribution P11-P42" or measurement uncertainty contribution U11-U42" clearly satisfies the digital information data IM for specifying performance criteria L-L". Thus, the specification regarding performance criteria L-L" may indicate a technical parameter contribution T31 "four channels, one channel for force detection, three channels for acceleration detection". Accordingly, in the compilation of measuring chains K-K" only those transmission members G3-G3" will be considered whose digital information data IG indicates a technical parameter contribution T31-T31" which meets this specification, for example whose technical parameter contribution T31-T31" indicates at least four channels. However, the specification regarding performance criteria L-L" may specify physical characteristic contributions P11, P21, P31, P41 "detection period from 03/01/2020 until 03/31/2020". In this case, only those transmission members G1-G4" will be considered in the compilation of the measuring chains K-K" whose digital information data IG indicates physical characteristic contributions P11-P11", P21-P21", P31-P31", P41-P41", which physical characteristic contributions P11-P11", P21-P21", P31-P31", P41-P41" satisfy the specification, i.e. that the transmission members G1-G4" will be available in the intended period of time for detecting the measured physical variable M. Furthermore, the specification with respect to performance criteria L-L" may also generally specify a "mean measurement uncertainty" as the measurement uncertainty U. In this case, only those transmission members G1-G4" will be considered in the automated compilation of the measuring chains K-K" whose digital information data IG indicates measurement uncertainty contributions U11-U42" that satisfy this specification, by excluding extreme measurement uncertainty contributions U11-U42", for example. In this way, the transmission members G1-G4" are subjected to filtering.

Figure 5:
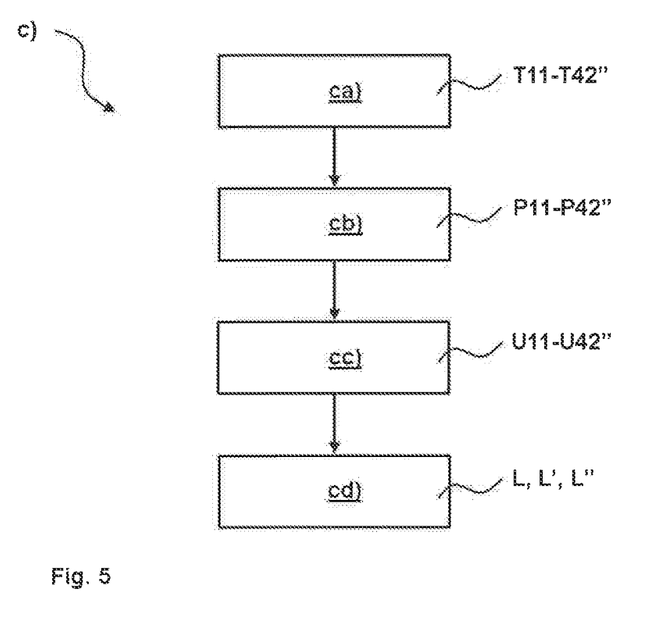
FIG. 5 shows a schematic diagram of partial steps ca) to cd) in step c) of the method V according to FIG. 2.

In step c), the computer program product C determines for each compiled measuring chain K-K" at least one performance criterion L-L" assigned to a measuring chain K-K". The performance criterion L-L" comprises at least one technical parameter T-T", at least one physical characteristic P-P", and at least one measurement uncertainty U-U". FIG. 5 is a schematical diagram of the sub-steps ca) to cd) of step c).

In a sub-step ca), for each transmission member G1-G4" of the compiled measuring chains K-K" the computer program product C reads digital information data IG regarding technical parameter contributions T11-T42" from the data memory R2. The computer program product C calculates the technical parameter T-T" of a measuring chain K-K" from the technical parameter contributions T11-T42" of the transmission members G1-G4" of the measuring chain K-K".

In a sub-step cb), for each transmission member G1-G4" of the compiled measuring chains K-K" the computer program product C reads digital information data IG regarding physical characteristic contributions P11-P42" from the data memory R2. The computer program product C calculates the physical characteristic P-P" of a measuring chain K-K" from the physical characteristic contributions P11-P42" of the transmission members G1-G4" of the measuring chain K-K".

In a sub-step cc), for each transmission member G1-G4" of the compiled measuring chains K-K" the computer program product C reads measurement uncertainty contributions U11-U42" from the data memory R2. The computer program product C calculates the measurement uncertainty U-U" of a measuring chain K-K" by calculating a square root of a sum of the squares of measurement uncertainty contributions U11-U42" of the transmission members G1-G4" of the measuring chain K-K".

In a sub-step cd), the computer program product C calculates performance criteria L-L" of the compiled measuring chains K-K" by compiling for each measuring chain K-K" the technical parameter T-T", the physical characteristic P-P", and the measurement uncertainty U-U" of this measuring chain K-K".

Figure 6:
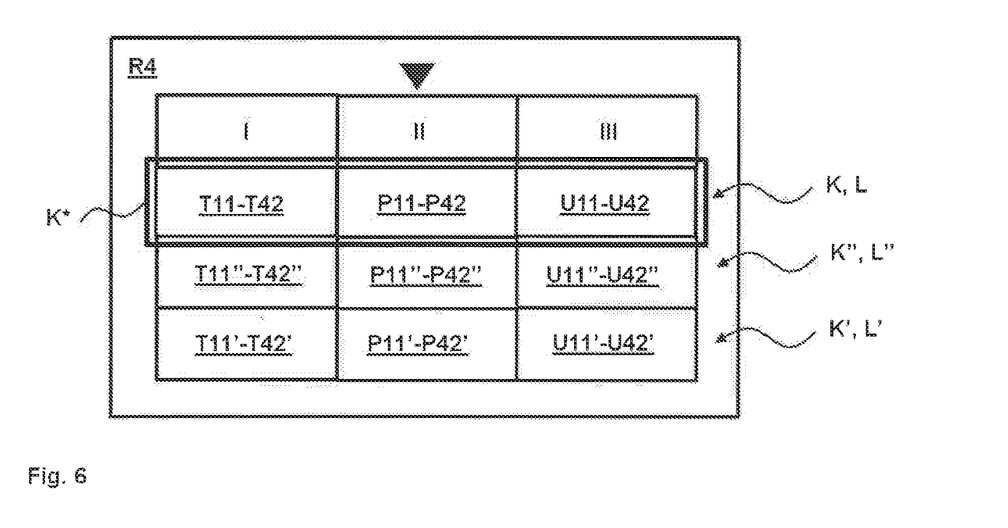
FIG. 6 shows a representation of an output unit R4 of the computing system R according to FIG. 3 for carrying out steps d) and e) of the method V according to FIG. 2.

In step d), the compiled measuring chains K-K" are compared to each other on the basis of the determined performance criteria L-L". FIG. 6 shows an output unit R4 of the computing system R. A table including three columns I-III and three rows, for example, is displayed on the output unit R4. A first column I indicates technical parameter contributions T11-T42", a second column II indicates physical characteristic contributions P11-P42", and a third column III indicates measurement uncertainty contributions U11-U42". A first row shows the technical parameter contributions T11-T42, the physical characteristic contributions P11-P42, and the measurement uncertainty contributions U11-U42 of the performance criterion L of the first measuring chain K. A second row indicates the technical parameter contributions T11"-T42", the physical characteristic contributions P11"-P42", and the measurement uncertainty contributions U11"-U42" of the performance criterion L" of the third measuring chain K". A third row indicates the technical parameter contributions T11'-T42', the physical characteristic contributions P11'-P42', and the measurement uncertainty contributions U11'-U42' of the performance criterion L' of the second measuring chain K'. In this way, the user is able to compare the compiled measuring chains K-K" in a performance-specific manner on the basis of the determined performance criteria L-L". For example, the user may recognize differences in the physical characteristics P11-P42" of the transmission members G1-G4" of the three compiled measuring chains K-K". Thus, the user may use the first physical characteristics P11-P11", P21-P21", P31-P31", P41-P41" to determine which transmission members G1-G4" will be available in the intended time period for detecting the measured physical variable M by means of the measuring system S.

In step e), a measuring chain K* is identified that best satisfies one of the performance criteria L-L" determined. For this purpose, the computer program product C may suggest a ranking for which the user makes a performance-specific ranking in the table displayed on the output unit R4. This ranking of the compiled measuring chains K-K" will occur on the basis of an amount of the technical parameter contributions T11-T42" and/or the physical characteristic contributions P11-P42" and/or the measurement uncertainty contributions U11-U42" of the performance criteria L-L" determined. As used in the present invention, the conjunction "and/or" designates both a logic operation AND and a logic operation OR.

Such a performance-specific ranking is shown schematically in FIG. 6 by a bold triangle above the second column II. In this example, the user has determined a ranking of the three compiled measuring chains K-K" according to their physical characteristic contributions P11-P42". The amounts of the physical characteristic contributions P11-P42" are sorted in ascending order on the basis of "availability" and "procurement price" of the transmission members G1-G4". The physical characteristics P11-P42 of the first measuring chain K are top ranking in the first row, the physical characteristics P11"-P42" of the third measuring chain K" are second ranking in the second row, and the physical characteristics P11'-P42' of the second measuring chain K' are third ranking in the third row. Accordingly, the first measuring chain K best satisfies the physical characteristics P11-P42" of the performance criteria L-L" determined, for example the transmission members G1-G4 of the first measuring chain K have first physical characteristics P11, P21, P31, P41 with the best "availability". The user may identify the first measuring chain K and mark it as an identified measuring chain K* as represented in FIG. 6 by a black frame. For example, the user may identify the measuring chain K by entering the letters "measuring chain K" on an input unit R3 in the embodiment of a computer keyboard. Alternatively, the user may identify the measuring chain K by touching the first row of the table displayed on the output unit R4 in the embodiment of a touch screen.

The computer program product C may make an unavailable transmission member G1-G4" available, for example by initiating a process of ordering a transmission member G1-G4" that is not available at the location of the measurement system S and sending it to the location of the measurement system S.

LIST OF REFERENCE NUMERALS a) specification of the measured physical variable to be detected
b) automated compilation of a plurality of measuring chains comprising transmission members necessary for detecting the specified measured physical variable
c) determination of performance criteria of the compiled measuring chains
ca) reading technical parameter contributions and calculating the technical parameters of the compiled measuring chains
cb) reading physical characteristic contributions and calculating physical characteristic contributions of the compiled measuring chains
cc) reading measurement uncertainty contributions and calculation of measurement uncertainties of the compiled measuring chains
cd) calculating performance criteria of the compiled measuring chains from technical parameters, physical characteristics and measurement uncertainties
d) comparison of the compiled measuring chains on the basis of the determined performance criteria
e) identification of a measuring chain, which measuring chain best satisfies one of the determined performance criteria
C computer program product
A intended application
E11-E42" relevant influencing variable
G1-G4" transmission member
I-III column
IG digital information data of a transmission member
IM digital information data of the measured physical variable to be detected
K-K" measuring chain
K* identified measuring chain
L-L" performance criterion
M measured physical variable
M1-M5 input field
O metrological compatibility
P physical characteristic
P11-P42" physical characteristic contribution
R computing system
R1 data processing processor
R2 data memory
R3 input unit
R4 output unit
R5 communication unit
S measuring system
T technical parameter
T11-T42" technical parameter contribution
U measurement uncertainty
U11-U42" measurement uncertainty contribution
V process

What is claimed is:

1. A method for detecting a measured physical variable by means of a measuring system, which measuring system resides at a measuring site and comprises a plurality of transmission members, and which transmission members form a measuring chain for measuring the measured physical variable, wherein transmission members that are immediately successive in the measuring chain are in a cause-and-effect relationship to each other, the method comprising the steps of:

a) providing a computing system for a computer program product, the computing system comprises an input unit, entering letters on the input unit in the embodiment of a computer keyboard or selecting input fields of the input unit in the embodiment of a touch screen; providing a computer program product that is configured to respond to entered letters or selected input fields by generating digital information data for specifying the measured physical variable that is to be detected;

b) the computing system comprises a data memory that stores digital information data of a plurality of transmission members, the digital information data of each transmission member designates at least one intended application, the computer program product is configured to read digital information regarding intended applications of a plurality of transmission members out of the data memory, the computer program product is configured to relate the digital information data of the measured physical variable to be detected and the read digital information data for intended applications, and the computer program product is configured to determine at least one transmission member whose digital information data indicates an intended application, which intended application corresponds with the digital information data for the detection of the specified measured physical variable, the digital information data of each transmission member stored in the data memory designates at least one metrological compatibility of the at least one determined transmission member with further transmission members, the computer program product is configured to read digital information regarding metrological compatibilities of the at least one transmission member with further transmission members of a plurality of transmission members out of the memory, the computer program product is configured to compile a plurality of measuring chains for the detection of the specified measured physical variable, wherein each measuring chain in the compilation includes a plurality of determined transmission members that have metrological compatibility with each other;

c) the digital information data of each transmission member stored in the data memory designate at least one of a technical parameter contribution, a physical characteristic contribution and a measurement uncertainty contribution, the computer program product is configured to read digital information regarding at least one of a technical parameter contribution, a physical characteristic contribution and a measurement uncertainty contribution of a plurality of transmission members out of the data memory, the computer program product is configured to calculate at least one of a technical parameter of a compiled measuring chain from the technical parameter contributions of the determined transmission members of the compiled measuring chain, a physical parameter of a compiled measuring chain from the physical parameter contributions of the determined transmission members of the compiled measuring chain and a measurement uncertainty of a compiled measuring chain from the measurement uncertainty contributions of the determined transmission members of the compiled measuring chain, the computer program product is configured to determine at least one performance criteria of each of the plurality of measuring chains in the compilation by compiling for each of the plurality of measuring chains in the compilation at least one of a technical parameter, a physical parameter and a measurement uncertainty;

d) the computing system comprises an output unit, the compiled measuring chains are represented on the output unit in the form of a table, the computer program product is configured to rank the compiled measuring chains in the table on the basis of an amount of at least one of a technical parameter, a physical parameter and a measurement uncertainty, differentiating between each of the measuring chains in the compilation on the basis of the determined performance criteria;

e) selecting from the measuring chains in the compilation, the measuring chain that best satisfies one of the determined performance criteria;

f) determining that one or more transmission members in the measuring chain that best satisfies one of the determined performance criteria and that are not available at a measuring site; and g) based on a determination that one or more transmission members in the measuring chain that best satisfies one of the determined performance criteria are not available, ordering the one or more transmission members that are not locally available and sending each ordered transmission member to the measuring site.

2. The method according to claim 1, wherein in step b) are compiled a plurality of measuring chains comprising transmission members necessary for the detection of the specified measured physical variable, which compiled measuring chains differ from each other in at least one transmission member.

3. The method according to claim 1, wherein for each transmission member the digital information data indicates at least one technical parameter contribution and at least one physical characteristic contribution and at least one measurement uncertainty contribution; in step a) are generated digital information data with respect to a specification of performance criteria; and in step b) only those transmission members are considered whose digital information data indicates a technical parameter contribution or a physical characteristic contribution or a measurement uncertainty contribution, which technical parameter contribution or physical characteristic contribution or measurement uncertainty contribution clearly satisfies the digital information data for the specification of performance criteria.

4. The method according to claim 1, wherein in step c) the performance criterion of a compiled measuring chain is calculated from the technical parameter and the physical characteristic and the measurement uncertainty of this compiled measuring chain.

5. The method according to claim 1, wherein the digital information data for each transmission member of a compiled measuring chain indicates at least one technical parameter contribution; and in step c) the technical parameter is calculated from the technical parameter contributions of the transmission members of the compiled measuring chain.

6. The method according to claim 1, wherein the digital information data for each transmission member of a compiled measuring chain indicates at least one physical characteristic contribution; and in step c) the physical characteristic is calculated from the physical characteristic contributions of the transmission members of the compiled measuring chain.

7. The method according to claim 1, wherein the digital information data for each transmission member of a compiled measuring chain indicates at least one measurement uncertainty contribution; and in step c) the measurement uncertainty is calculated as a square root of a sum of the squares of measurement uncertainty contributions of the transmission members of the compiled measuring chain.

* * * * *